United States Patent [19]

DiMarco et al.

[11] Patent Number: 4,927,308
[45] Date of Patent: May 22, 1990

[54] FASTENING MEANS

[75] Inventors: Bernard DiMarco, Lilburn; Steven A. Kaufman, Decatur, both of Ga.

[73] Assignee: Siemens Energy & Automation, Inc., Alpharetta, Ga.

[21] Appl. No.: 278,628

[22] Filed: Dec. 1, 1988

[51] Int. Cl.⁵ ............................................ F16B 37/00
[52] U.S. Cl. ................................. 411/437; 411/103; 403/260; 403/354
[58] Field of Search ............... 411/437, 907, 908, 103, 411/108, 335, 84, 85, 105, 177, 182, 324; 403/260, 354, 361

[56] References Cited

U.S. PATENT DOCUMENTS

| | | | |
|---|---|---|---|
| 3,527,280 | 9/1970 | MacNorius | 411/182 |
| 3,883,682 | 5/1975 | Cagle et al. | 411/908 X |
| 4,116,510 | 9/1978 | Franco | 411/437 X |
| 4,197,030 | 4/1980 | Debaigt | 411/437 X |
| 4,305,678 | 12/1981 | Majoor | 403/361 |
| 4,472,098 | 9/1984 | Kiefer | 411/907 X |
| 4,601,621 | 7/1986 | Permoda | 411/437 X |
| 4,861,207 | 8/1989 | Do | 411/108 |

OTHER PUBLICATIONS

Bulletin from Siemens Energy & Automation, Inc., entitled "I-T-E Sentron Series Circuit Breakers" (1987); pp. 1-25.

Primary Examiner—Gary L. Smith
Assistant Examiner—Jerry Redman
Attorney, Agent, or Firm—James G. Morrow; Lawrence C. Edelman

[57] ABSTRACT

An improved connection assembly which saves space and eliminates the need for many conventional fastener means such as nuts and flanges. The assembly includes a receptacle for accepting and engagement member, wherein a small amount of clearance is present between the receptacle and the engagement member. The engagement member includes a slot having two substantially parallel surfaces. A threaded fastener is used to fix the engagement member within the receptacle by passing the fastener through an opening in the bottom of the receptacle and causing the threads of the fastener to cut into and engage the surfaces of the slot.

7 Claims, 2 Drawing Sheets

FASTENING MEANS

BACKGROUND OF INVENTION

This invention relates to a fastening means, and more particularly, to a fastening means that is integral with the housing portions of an apparatus.

FIG. 1 illustrates a well known arrangement for fastening two non-parallel members together. In this arrangement, an L-shaped member 1 is fastened to a flat member 2 with a bolt 3 which passes through the members 1, 2. The bolt 3 can be fixed within the members 1, 2, using a nut 4 or a threaded hole in member 1. A disadvantage of this arrangement is that the member 1 requires the mounting flange 1a for purposes of mounting the member 1 to the member 2. Another disadvantage of this arrangement is that the mounting flange 1a occupies space, and in many situations where size is important, it would be advantageous to eliminate the mounting flange leg 1a to save space.

BRIEF DESCRIPTION OF THE INVENTION

An object of the present invention is to eliminate the need for a mounting flanges and other elements needed to fasten members together.

Accordingly, there is provided an assembly for connecting two members. The assembly comprises an engagement receptacle, an engagement member including a slot having an open end, and means for fixing the engagement member in the engagement receptacle. The engagement member is adapted to rest in the engagement receptacle and the means for fixing the engagement member in the engagement receptacle engages the slot.

An advantage of the present invention is that it eliminates the need for nuts for fastening non-parallel members together. Another advantage of the present invention is that it eliminates the need for tapped holes and can eliminate the need for manufacturing any of the members with threads for engaging the threads of a bolt.

Various other objects and advantages of the present invention will become apparent from the following description, with reference to the accompanying drawings.

DETAILED DESCRIPTION OF THE PREFERRED EMBODIMENT

Figure 1:
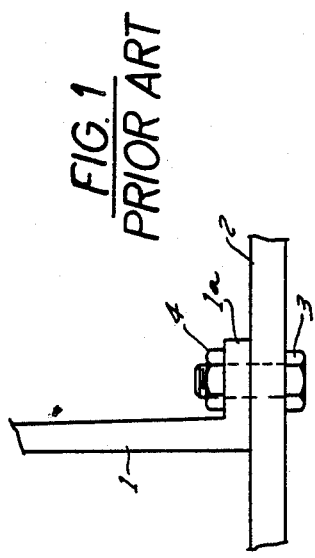
FIG. 1 illustrates a known arrangement for fastening two non-parallel members together.
Figure 2:
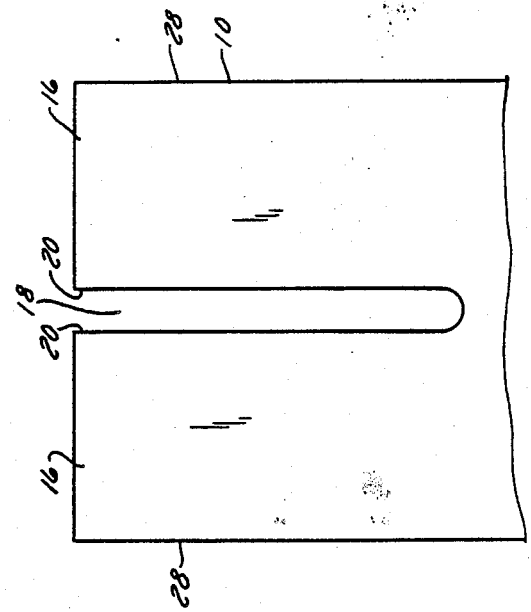
FIG. 2 is a side view of an engagement member.
Figure 3:
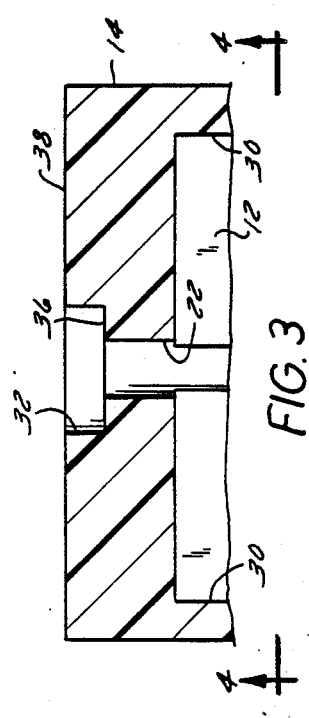
FIG. 3 is a side section view of a receptacle member.
Figure 4:
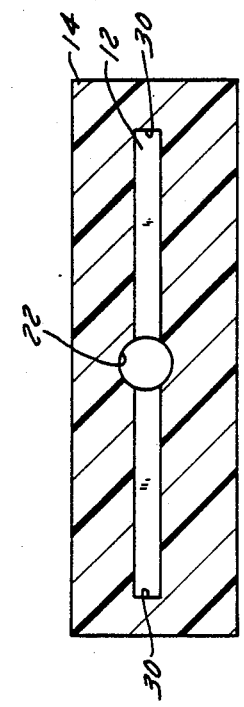
FIG. 4 is a bottom view of the receptacle member as viewed along line 4—4 in FIG. 3.
Figure 5:
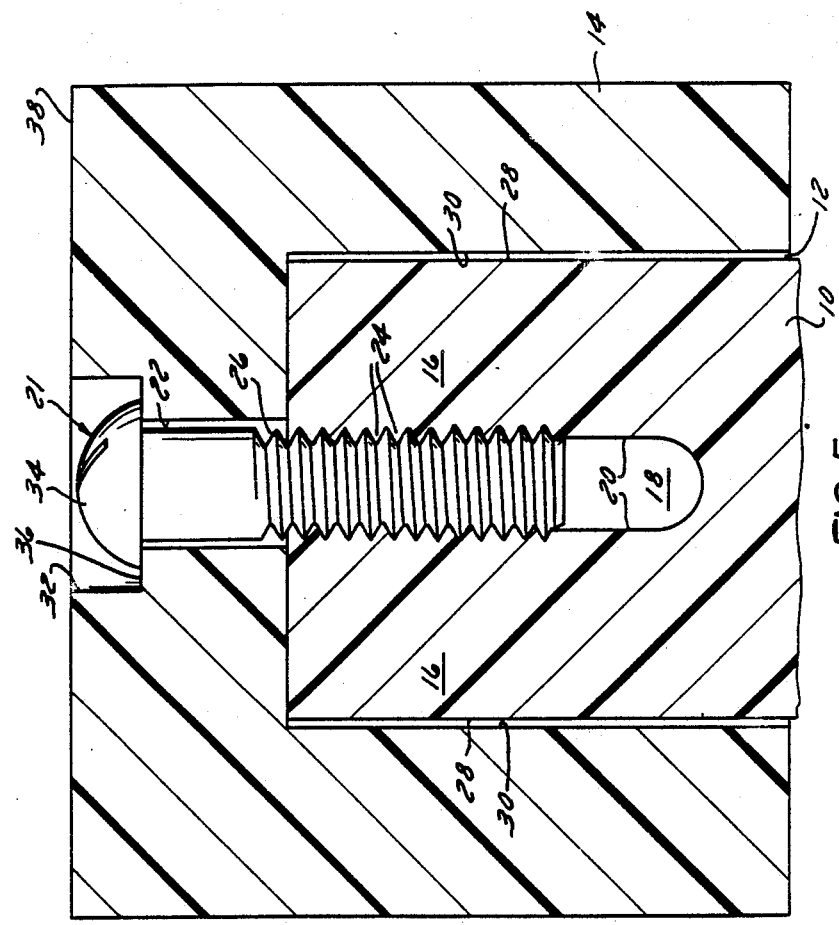
FIG. 5 is a side section view of the engagement member in engagement with the receptacle member.
Figure 6:
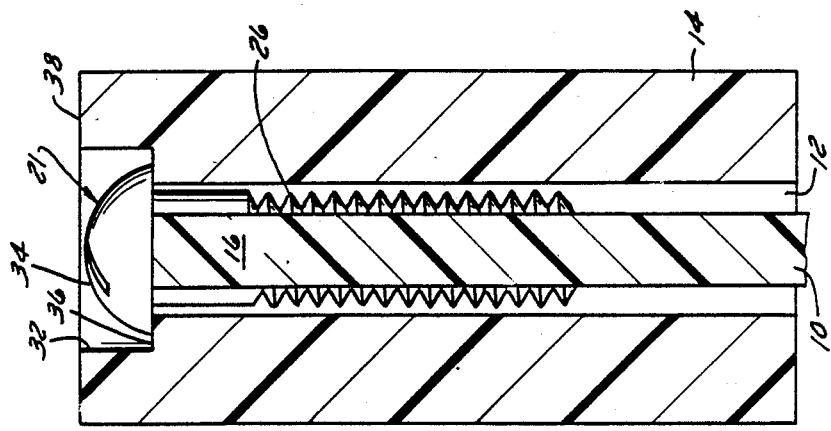
FIG. 6 is an end section view of the engagement member in engagement with the receptacle member.

Referring now to the figures, FIG. 2 illustrates an engagement member 10 which is fabricated such that it can rest within the engagement receptacle 12 of the base member 14 illustrated in FIGS. 3 and 4. FIGS. 5 and 6 illustrate the relationship between the engagement member 10 and the base member 14 when these members 10, 14 are fixed together.

The engagement member 10 is fabricated such that it includes two flanges 16. The flanges 16 are arranged such that a slot 18 is formed between the flanges 16, wherein the slot 18 includes two substantially parallel surfaces 20. Subsequent to positioning the flanges 16 in the engagement receptacle 12, a threaded fastener such as a screw 21 can be inserted into the opening 22 in the base member 14 and rotated such that the threads 26 of the screw 21 engage the surfaces 20. In the preferred embodiment, the member 10 is fabricated from a material which allows the screw 21 to cut threads 24 in the surfaces 20. These threads 24 engage the threads 26 of the screw 21 and produce a positive engagement between the member 10 and the screw 21. By way of example, the member 10 can be fabricated from a plastic.

Referring now to FIG. 5, the receptacle 12 is manufactured such that there is a small clearance between the sides 28 of the member 10 and the walls 30 of the receptacle 12. By maintaining a small clearance, the flanges 16 are prevented from deflecting outward when the screw 21 is rotated into the slot 18 and cuts threads 24 in the surfaces 20. In applications where a plastic is a suitable material for the base member 14 the receptacle 12 is preferably fabricated via a molding process.

The base member 14 can be manufactured to include a recess 32 for the screw head 34. Thus, when the screw 21 is drawn up tight against the recess bearing surface 36 the screw head 34 rests below the surface 38 of the base member 14. By way of example, a thread forming or thread cutting type screw may by used to facilitate the cutting of threads 24 in the surfaces 20.

While one embodiment of a connection assembly has been shown and described in detail herein, various other changes and modifications may be made to adapt the assembly for use in various articles. For example, to save space in articles such as a multi-pole circuit breakers, the divider walls between the poles of the circuit breaker can be fabricated to include a slot and flanges, and the base of the circuit breaker housing can be fabricated to include a receptacle for the flanges. The use of this type of connection assembly throughout a circuit breaker can save space and aid in reducing the overall size of the circuit breaker.

We claim:

1. An assembly for connecting two members comprising:
    a one piece engagement receptacle including a first end opening and a second end opening substantially smaller than the first end opening;
    an engagement member including a slot defining at least two substantially parallel surfaces and an open end, wherein the engagement member is adapted to rest in the engagement receptacle such that the engagement member passes through the first end opening and the open end abuts the engagement receptacle such that it is restricted from entering the second end opening; and
    means for fixing the engagement member in the engagement receptacle, wherein the means engages the surfaces and the second end opening is adapted to accept the means.

2. The assembly of claim 1, wherein the means for fixing is a threaded fastener.

3. The assembly of claim 1, further comprising a recess for the means for fixing, wherein an end of the means for fixing is adapted to rest within the recess.

4. The assembly of claim 1, wherein the engagement member is fabricated from a plastic.

5. The assembly of claim 4, wherein the second member is fabricated from plastic.

6. An assembly for connecting comprising:
 a first member including a one piece engagement receptacle including a first end opening and a second end opening substantially smaller than the first end opening;
 a second member including a first flange having a first surface arranged adjacent to a second flange having a second surface, the first surface being substantially parallel with the second surface, wherein the flanges are adapted to rest in the engagement receptacle, such that the flanges pass through the first end opening and the flanges abut the engagement receptacle such that the flanges are restricted from entering the second end opening; and
 a threaded fastener for fixing the first and second flanges within the engagement receptacle, wherein the fastener is adapted to engage the first surface and the second surface, and wherein the second end opening is adapted to accept the threaded fastener.

7. The assembly of claim 6, wherein the first member further includes a fastener recess, wherein an end of the threaded fastener is adapted to rest in the fastener recess.

* * * * *